United States Patent [19]

Kotani

[11] Patent Number: 5,545,928
[45] Date of Patent: Aug. 13, 1996

[54] ELECTRIC POWER GENERATION CONTROL METHOD IN A HYBRID VEHICLE UTILIZING DETECTED GENERATOR OUTPUT AND ENGINE REVOLUTIONS

[75] Inventor: Takeshi Kotani, Mishima, Japan

[73] Assignee: Toyota Jidosha Kabushiki Kaisha, Toyota, Japan

[21] Appl. No.: 303,202

[22] Filed: Sep. 8, 1994

[30] Foreign Application Priority Data

Sep. 17, 1993 [JP] Japan ................... 5-231714

[51] Int. Cl.⁶ ................ H02P 9/04; B60L 11/02
[52] U.S. Cl. .............. 290/40 C; 290/14; 290/40 R
[58] Field of Search .............. 290/14, 27, 40 R, 290/45, 40 C; 318/139; 320/61; 60/716

[56] References Cited

U.S. PATENT DOCUMENTS

| | | | |
|---|---|---|---|
| 3,551,685 | 12/1970 | Corry | 290/14 |
| 3,792,327 | 2/1974 | Waldorf | 318/139 |
| 4,187,436 | 2/1980 | Etienne | 290/27 |
| 4,305,254 | 12/1981 | Kawakatsu et al. | 60/716 |
| 4,313,080 | 1/1982 | Park | 320/61 |
| 4,668,872 | 5/1987 | Lerouge et al. | 290/40 R |
| 5,081,365 | 1/1992 | Field et al. | 290/45 |
| 5,264,764 | 11/1993 | Kuang | 318/139 |
| 5,428,274 | 6/1995 | Furutani et al. | 318/139 |

FOREIGN PATENT DOCUMENTS

| | | |
|---|---|---|
| 50-107610 | 8/1975 | Japan. |
| 51-39813 | 4/1976 | Japan. |
| 5-141290 | 6/1993 | Japan. |

*Primary Examiner*—Thomas M. Dougherty
*Assistant Examiner*—Christopher Cuneo
*Attorney, Agent, or Firm*—Oliff & Berridge

[57] ABSTRACT

An electric power generation control method in a hybrid vehicle. A target generator output is calculated based on a state of charge, a catalyst temperature, etc., and the target number of engine revolutions is calculated based on the target generator output. A field current is corrected in response to the comparison result between a control target range determined in response to the target number of engine revolutions and the detected number of engine revolutions, thereby performing target control of the number of engine revolutions. Then, a correction amount of a throttle angle is set in response to the comparison result between a control target range determined in response to the target generator output and the detected generator output and the throttle angle is corrected, thereby performing target control of the generator output of a generator. Since target control of the number of revolutions is first performed and then target control of the generator output is performed, a control error caused due to engine load being high or low can be prevented. Preferred target control of the number of engine revolutions and the generator output of the generator can be performed regardless of whether engine load is high or low.

14 Claims, 7 Drawing Sheets

ELECTRIC POWER GENERATION CONTROL METHOD IN A HYBRID VEHICLE UTILIZING DETECTED GENERATOR OUTPUT AND ENGINE REVOLUTIONS

BACKGROUND OF THE INVENTION a) Field of the Invention

This invention relates to a method of controlling a generator output of a generator mounted on a so-called hybrid vehicle, namely, an electric power generation control method in a hybrid vehicle.

b) Description of the Related Art

An electric vehicle is a vehicle using a motor as a driving source and a so-called hybrid vehicle is known as one type of electric vehicle. The hybrid vehicle is an electric vehicle equipped with an engine in addition to a motor. Some hybrid vehicles, wherein a generator is driven by an engine and a power generation output of the generator can be used for driving the motor, are called series hybrid vehicles (SHVs).

Figure 6:
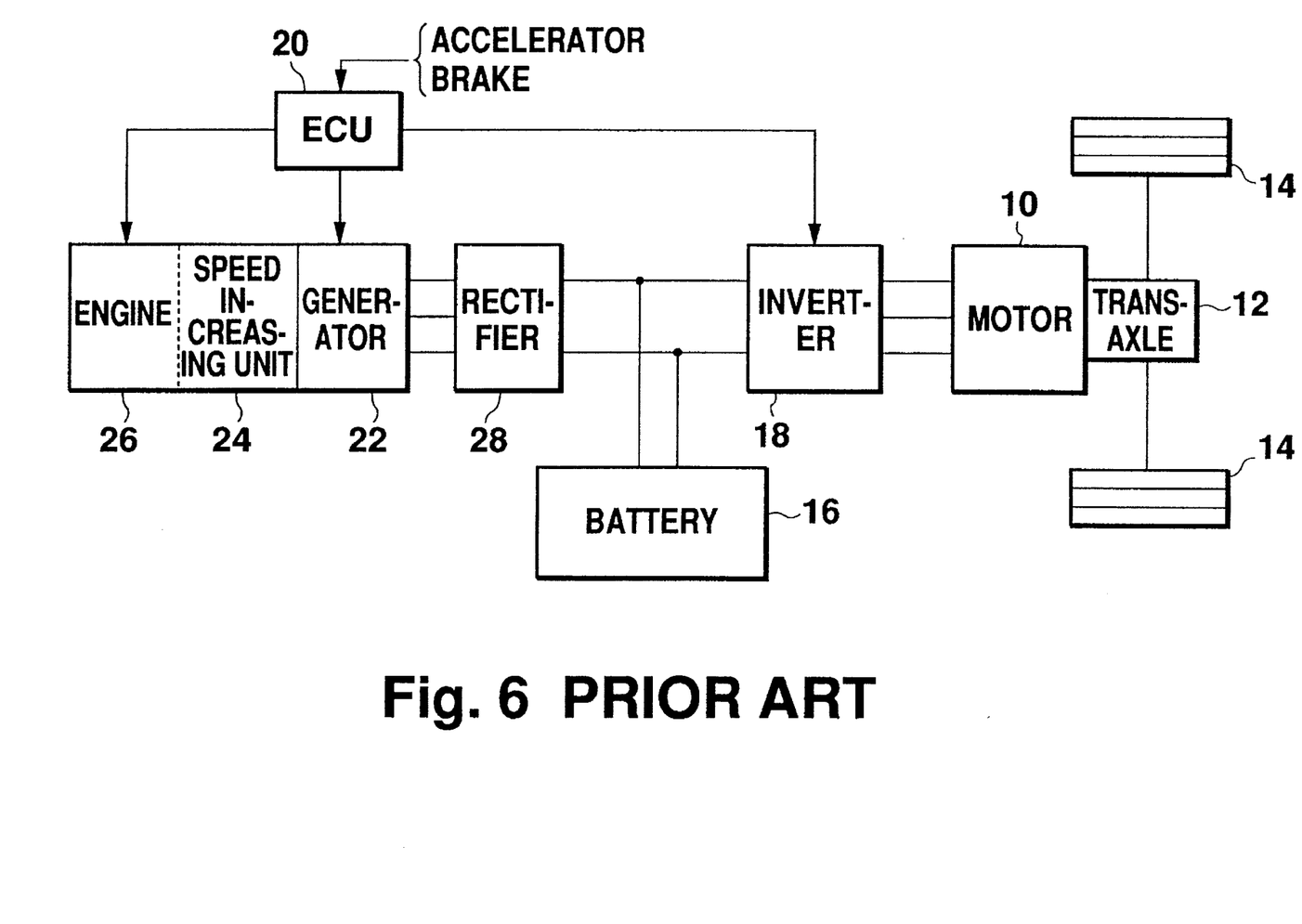
FIG. 6 is a block diagram showing the configuration of one example of an SHV.

FIG. 6 is a block diagram showing the configuration of one example of an SHV. The vehicle shown in the figure uses an AC induction motor 10 as a driving source. An output of the motor 10 is transmitted via a transaxle 12, etc., to driving wheels 14 for use as a driving force of the vehicle.

The vehicle is equipped with a chargeable and dischargeable battery 16 such as a lead battery. A discharge output of the battery 16 is converted into three-phase AC power by an inverter 18 made up of a plurality switching elements, and the power is supplied to the motor 10. At this time, the inverter 18 is controlled by an ECU (electronic control unit) 20. That is, the ECU 20 calculates reference torque indicating torque to be output from the motor, in response to the driver of the vehicle who presses down on an accelerator or brake pedal, and controls the inverter 18 in response to the found reference torque, thereby controlling the power supplied to the motor 10, so that torque corresponding to the reference torque is output from the motor 10.

In addition to the battery 16, a generator 22 is mounted as means for supplying power via the inverter 18 to the motor 10. The generator 22 is connected via a speed increasing unit 24 to an engine 26. When the ECU 20 operates the engine 26, an output of the engine 26 is transmitted via the speed increasing unit 24 to the generator 22. At this time, when a field current is supplied to the generator 22 under the control of the ECU 20, a power generation output is provided from the generator 22. The generator 22 shown in FIG. 6 is a three-phase AC generator and an output of the generator 22 is rectified by a rectifier 28 for supply to the inverter 18 and the battery 16. Therefore, the motor 10 can be driven by an output of either the battery 16 or the generator 22 and the battery 16 can be charged not only by regeneration of the motor 10, but also by an output of the generator 22. The speed increasing unit 24 is a mechanism for raising the number of revolutions of the engine 26 to a value corresponding to the generator 22.

Figure 7:
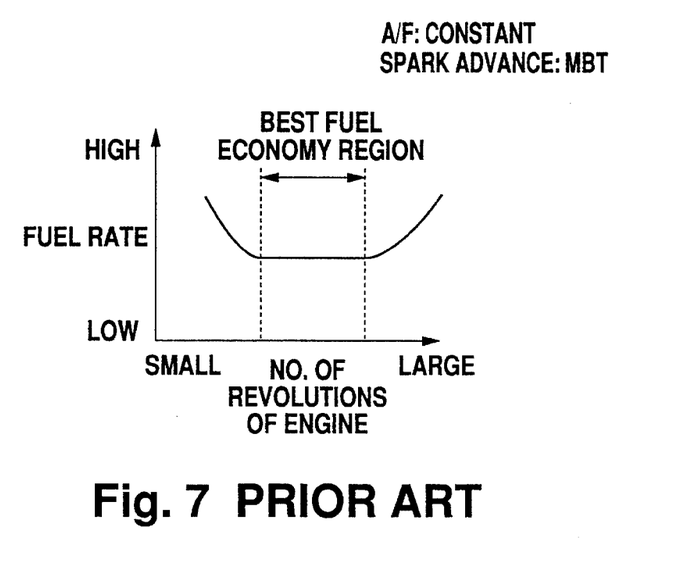
FIG. 7 is a characteristic chart of the number of engine revolutions vs. fuel rate showing best fuel economy control of an engine.

To run the engine 26, the ECU 20 controls run conditions of the engine 26 so that the engine 26 rotates in the region having the best fuel economy, as shown in FIG. 7, for example. The run conditions to be controlled include fuel injection, spark advance, throttle angle, etc., for example. The best fuel economy region is in the range of 1200 rpm to 2800 rpm with respect to a four-cylinder engine, for example. Normally, the emission contents of exhaust gases from the engine 26 are improved in this region.

To provide required power from the generator 22 while such highly efficient running of the engine 26 is being performed, the ECU 20 controls the field current of the generator 22, for example, whereby a generator output from the generator 22 can be controlled to the target value while the engine 26 is driven in the best fuel economy region. Such control is disclosed in Japanese Patent Laid-Open No. Sho 51-39813, etc., for example.

However, if generator output of a generator 22 is controlled by controlling the run conditions of an engine 26 and the field current of the generator 22, the number of revolutions of the engine 26 may not necessarily be a value falling within the best fuel economy region. That is, the individual characteristics of engines and generators vary from one to another in mass production and the difference between the individual engines or the difference between the individual generators changes over time. When such variations or changes with time occur, even if the generator output according to the target value is provided from the generator 22 by controlling the field current, the number of revolutions of the engine 26 will still vary.

Figures 8A, 8B:
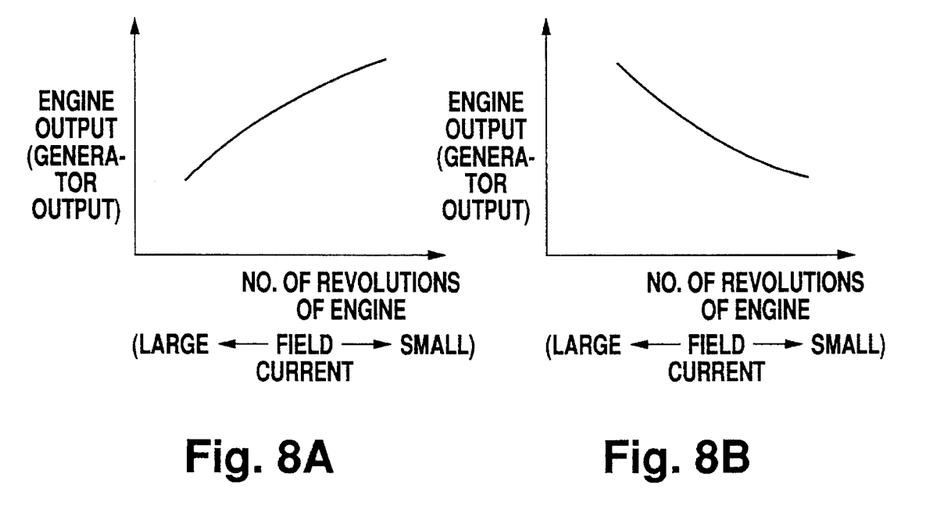
FIG. 8A is a chart showing the relationship between the number of engine revolutions and engine output when load is high.
FIG. 8B is a chart showing the relationship between the number of engine revolutions and engine output when load is low.

When the field current of the generator 22 is small, the number of revolutions of the engine 26 increases; when it is large, the number of revolutions of the engine 26 decreases. Further, when the number of revolutions of the engine 26 changes, not only an output of the engine 26, but also generator output of the generator 22 changes accordingly. However, the characteristic varies depending on whether the load of the engine 26 is high or low (for example, whether the throttle angle is large or small). That is, for example, the engine output characteristic of a gasoline engine at equal throttle when load is high follows a trend to move up to the right with respect to the number of revolutions of the engine as shown in FIG. 8A; the engine output characteristic at equal throttle when load is low follows a trend to move down to the right with respect to the number of revolutions of the engine as shown in FIG. 8B. Therefore, even if an attempt is made to control a generator output of a generator 22 by changing the field current of the generator 22 as in the related art, the generator output change trend when the engine load is high differs from that when the engine load is low.

SUMMARY OF THE INVENTION

It is a first object of the invention to enable preferred target control of both the number of revolutions of an engine and the generator output of a generator. It is a second object of the invention to provide such control without being affected by a load of the engine. It is a third object of the invention to prevent mass production variations in individual characteristics of an engine and a generator, and changes with time in their individual differences, from changing the control result for efficiently running the engine and improving its emission by providing the control described above. It is a fourth object of the invention to accomplish these objects by improving procedures related to generator output control of the generator.

To these ends, according to a first aspect of the invention, there is provided an electric power generation control method executed by control means in a hybrid vehicle equipped with a motor as a driving source of the vehicle; a generator for supplying a power generation output thereof to the motor; an engine for driving the generator for rotation; means for detecting the number of revolutions of the engine and a generator output of the generator; and the control means for controlling a field current of the generator and a run condition of the engine, the method comprising the steps of:

a) determining control target ranges for both the number of revolutions of the engine and the generator output of the generator;

b) correcting the field current of the generator to a smaller value if the detected number of revolutions of the engine is below its control target range or to a larger value if the detected number of revolutions of the engine is above its control target range; and c) correcting the run condition of the engine so that when the detected number of revolutions of the engine is within its control target range, if the detected generator output of the generator is lower than its control target range, the load of the engine is increased or so that if the detected generator output of the generator is higher than its control target range, load of the engine is decreased, d) whereby both the number of revolutions of the engine and the generator output of the generator are controlled within their control target ranges.

According to a second aspect of the invention, there is provided an electric power generation controller mounted in a hybrid vehicle having a motor as a driving source of the vehicle; a generator for supplying a power generation output thereof to the motor; and an engine for driving the generator for rotation, the controller comprising:

a) means for determining control target ranges for both the number of revolutions of the engine and the generator output of the generator;

b) means for detecting the number of revolutions of the engine and a generator output of the generator;

c) means for correcting the field current of the generator to a smaller value if the detected number of revolutions of the engine below its control target range or to a larger value if the detected number of revolutions of the engine is above its control target range; and d) means for correcting the run condition of the engine so that when the detected number of revolutions of the engine is within its control target range, if the detected generator output of the generator is lower than its control target range, the load of the engine is increased or so that if the detected generator output of the generator is higher than its control target range, the load of the engine is decreased, e) whereby both the number of revolutions of the engine and the generator output of the generator are controlled within their control target ranges.

According to a third aspect of the invention, there is provided a hybrid vehicle comprising:

a) a motor as a driving source of the vehicle;

b) a generator for supplying a power generation output thereof to the motor;

c) an engine for driving the generator for rotation; and d) an electric power generation controller according to the second aspect of the invention.

In the invention, first, control target ranges are set for both the number of revolutions of the engine and the generator output of the generator. For example, the control target range of the generator output can be determined in response to the state of charge, catalyst temperature, motor load, etc., and the control target range of the number of engine revolutions can be set in response to the control target range of the generator output. Further, the number of revolutions of the engine and the generator output of the generator are detected. The latter can be detected as the product of the output voltage and the current of the generator.

In the invention, the detected number of revolutions of the engine is compared with its control target range. If the former is below the latter as a result of the comparison, the field current of the generator is corrected to a smaller value; if the former is above the latter, the field current of the generator is corrected to a larger value. The number of engine revolutions increases when the field current becomes small, and decreases when the field current becomes large. Target control of the number of engine revolutions is performed by correcting the field current of the generator based on such a relationship. On/off control, amplitude control, duty control, etc., can be executed for the field current.

Further, if the detected number of engine revolutions is within the target control range as a result of the comparison, then the detected generator output of the generator is compared with its control target range. If the generator output of the generator is lower than the control target range as a result of the comparison, the run condition of the engine, such as the throttle angle, is corrected so that the load of the engine is increased or if the former is higher than the latter, the run condition of the engine is corrected so that the load of the engine is decreased. As can be seen by comparing FIGS. 8A and 8B, when the load of the engine is low, the generator output of the generator becomes a smaller value although the number of engine revolutions is the same. In the invention, engine load is controlled by controlling the run condition of the engine so as to provide a generator output within the control target range based on the relationship. The reference value of the run condition to be corrected is set according to the condition amount indicting a warm-up condition of the engine, for example, a temperature of the engine cooling water.

As described above, according to the invention, the field current of the generator and the run conditions of the engine are corrected in response to the detection results of the number of revolutions of the engine and the generator output of the generator, so that preferred target control of both the number of revolutions of the engine and the generator output of the generator can be performed. Therefore, mass production variations in the engine and generator characteristics and occurrence of a control error associated with their change with time can be prevented. Since target control of the number of engine revolutions is first performed by correcting the field current and then target control of the generator output of the generator is performed by correcting the run conditions of the engine, the target control described above can be executed in a preferred manner independently of whether load of the engine is high or low. Further, such control can be performed to efficiently run the engine, reduce its emission and improve power generation efficiency of the generator.

DESCRIPTION OF THE PREFERRED EMBODIMENTS

Referring now to the accompanying drawings, there are shown preferred embodiments of the invention. Components identical with or similar to those previously described with reference to FIG. 6 are denoted by the same reference numerals in FIGS. 1 and 5 and will not be discussed again.

a) First embodiment

Figure 1:
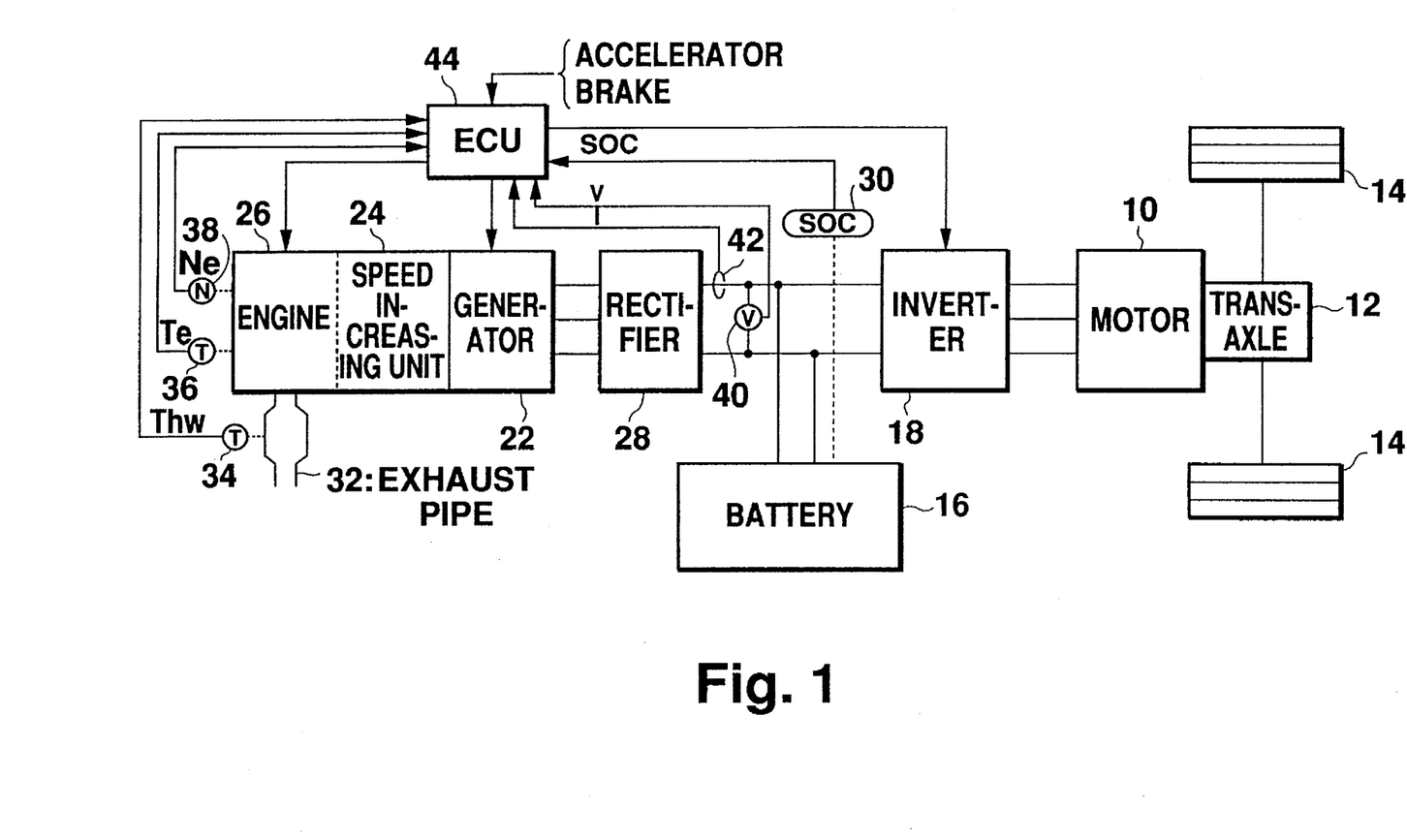
FIG. 1 is a block diagram showing the system configuration of an SHV according to a first embodiment of the invention.

FIG. 1 shows the configuration of an SHV according to a first embodiment of the invention. As shown here, installed in the first embodiment are an SOC sensor 30 for detecting a state of charge (SOC), to calculate target generator output $P_T$ described below, and a temperature sensor 34 for detecting a temperature $T_{hw}$ of a catalyst (not shown) located in an exhaust pipe 32 of an engine 26. Further, the engine 26 is equipped with a temperature sensor 36 for detecting a temperature $T_e$ of engine cooling water to calculate a reference throttle angle $S_o$ described below. Further, the engine 26 is equipped with a rotation speed sensor 38 for detecting the number of engine revolutions, $N_e$, for target control of the number of engine revolutions, $N_e$. A voltage sensor 40 and a current sensor 42 for detecting a voltage and a current output from a rectifier 28 are installed for performing target control of a generator output of a generator 22. An ECU 44 executes control in FIG. 2 described below based on outputs of the sensors 30 and 34–42.

Figure 2:
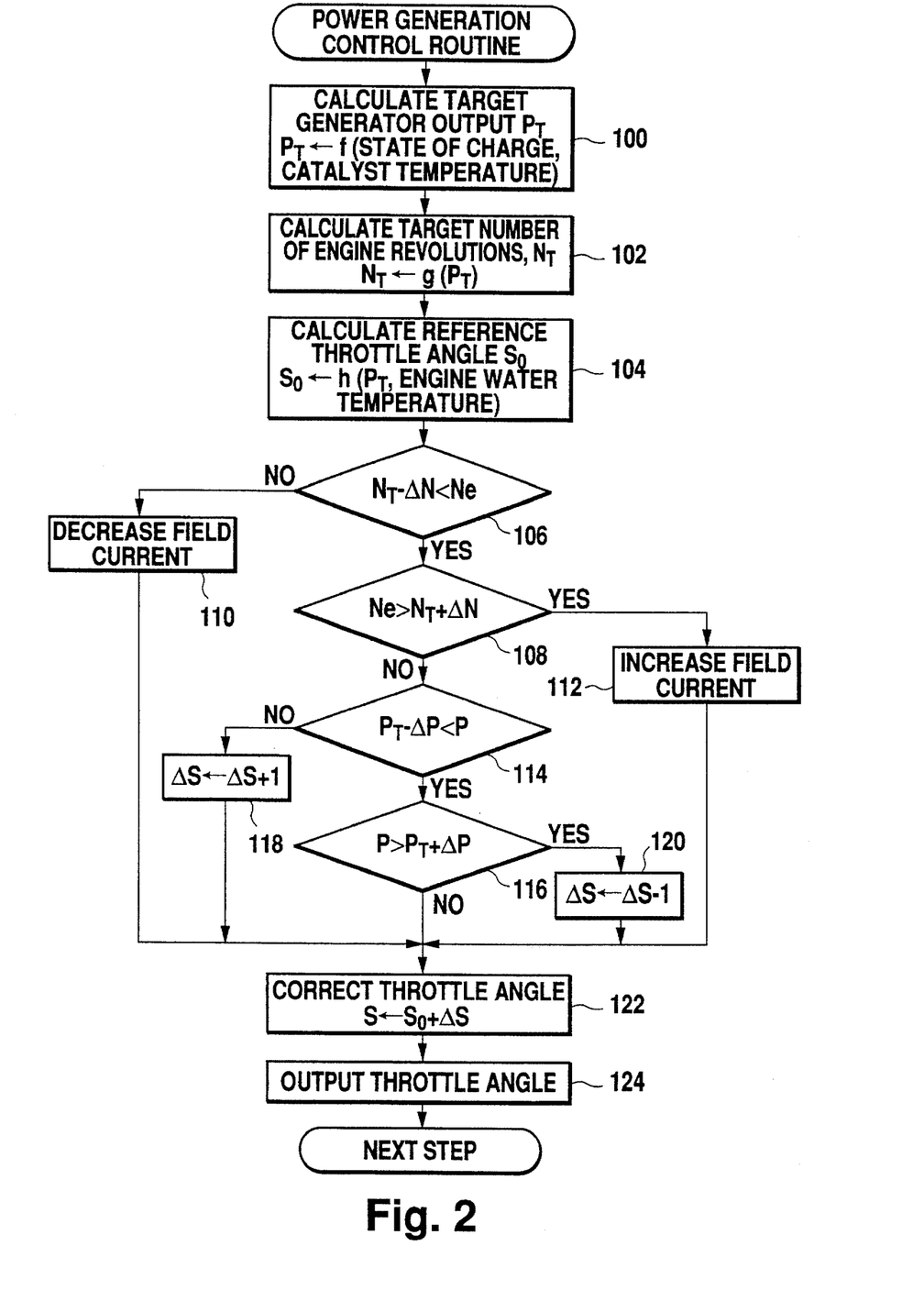
FIG. 2 is a flowchart showing an operation flow of an ECU in the first embodiment in FIG. 1.

Shown in FIG. 2 is a flow of a power generation control routine repeatedly executed at an appropriate timing by the ECU 44. As shown here, in the routine, first the ECU 44 references a table f with the SOC detected by the SOC sensor 30 and the catalyst temperature $T_{hw}$ detected by the temperature sensor 34 for calculating target generator output $P_T$ at step 100. For example, if SOC or $T_{hw}$ is low, the target generator output $P_T$ is calculated so that $P_T$ increases to charge a battery 16 or activate the catalyst. Subsequently, the ECU 44 references a table g with the target generator output $P_T$ found at step 100 as a key for calculating the target number of engine revolutions, $N_T$, at step 102. The target generator output $P_T$ and the target number of engine revolutions, $N_T$, are calculated in a similar manner. Subsequently, the ECU 44 calculates a reference throttle angle $S_o$ at step 104 by referencing a table h with the target generator output $P_T$, determined at step 100, and the engine water temperature $T_e$, detected by the temperature sensor 36, as keys. In the calculation, the engine water temperature $T_e$ is used to indicate the warm-up state of the engine 26.

Figure 3A:
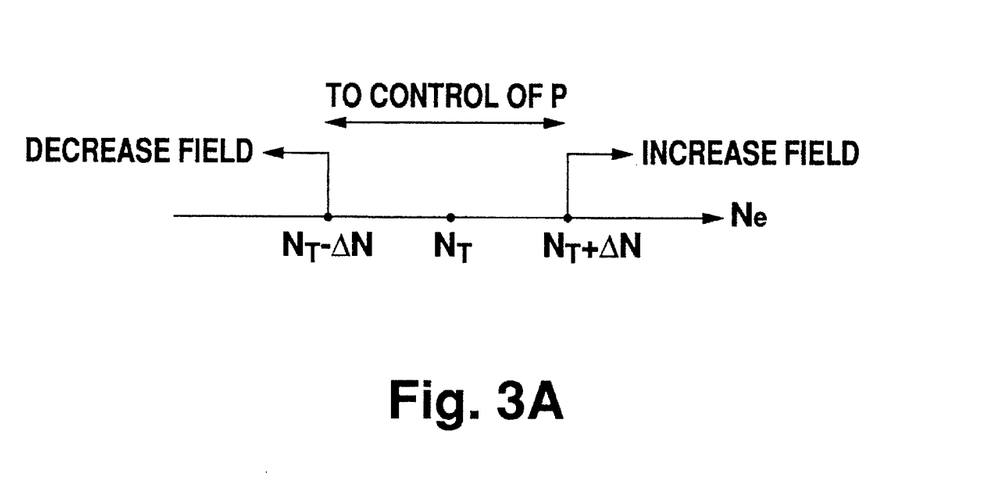
FIG. 3A is a drawing showing a control target range setting of the number of engine revolutions in the first embodiment in FIG. 1.

Then, at steps 106 and 108, the ECU 44 determines whether or not the number of revolutions of the engine 26 detected by the rotation speed sensor 38, $N_e$, is within the control target range defined by the target number of engine revolutions, $N_T$, determined at step 102. In response to the result of the determination, the ECU 44 controls the field current of the generator 22 at steps 110 and 112. That is, as shown in FIG. 3A, if the detected number of engine revolutions, $N_e$, is less than the lower limit of the control target range, $N_T-\Delta N$, at step 106, the field current of the generator 22 is decreased at step 110; if the number of revolutions, $N_e$, is greater than the upper limit of the control target range, $N_T+\Delta N$, at step 108, the field current of the generator 22 is increased at step 112. Increasing or decreasing the field current can be controlled according to the on/off duration of the field current in digital control, or amplitude of the field current in analog control. $\Delta N$ is a minute value defining the control target range of the number of revolutions, $N_e$.

Figure 3B:
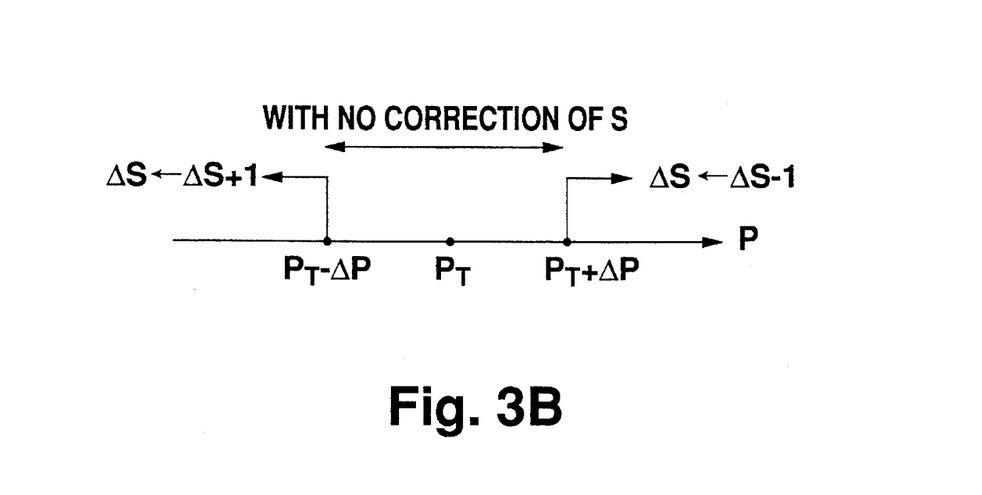
FIG. 3B is a drawing showing a control target range setting of generator output of a generator in the first embodiment in FIG. 1.

If the detected number of revolutions, $N_e$, is within the control target range defined in response to the target number of engine revolutions, $N_T$, as a result of the determination at steps 106 and 108, then the ECU 44 executes a determination as to generator output P of the generator 22 at steps 114 and 116. That is, the product of the voltage detected by the voltage sensor 40 and the current detected by the current sensor 42 represents the generator output P of the generator 22, so P is compared with the control target range defined in response to the target generator output $P_T$. If the detected generator output P is less than the lower limit of the control target range, $P_T-\Delta P$, as a result of the comparison at step 114, 1 is added to the throttle angle correction amount $\Delta S$ at step 118, as shown in FIG. 3B; in contrast, if the generator output P is greater than the upper limit of the control target range, $P_T+\Delta P$, at step 116, 1 is subtracted from the throttle angle correction amount $\Delta S$ at step 120.

$\Delta S$ is reset at the same time that $S_o$ is set at step 102 or before.

When a) the field current is corrected at step 110 or 112, b) the throttle angle correction amount $\Delta S$ is corrected at step 118 or 120, or c) the generator output P is within the control target range at steps 114 and 116, the ECU 44 executes step 122. At step 122, the throttle angle correction amount $\Delta S$ is added to the reference throttle angle $S_o$ found at step 104, and at step 124, the throttle angle S provided at step 122 is output to the engine 22, whereby the throttle angle is corrected in response to the determined result of the generator output P.

Thus, in the embodiment, the detected number of engine revolutions, $N_e$, is compared with its control target range and the field current of the generator 22 is corrected in response to the comparison result. As described above, if the value of the field current of the generator 22 is decreased, the number of engine revolutions, $N_e$, increases and when the field current is increased, the number of engine revolutions, $N_e$, decreases. Therefore, the number of revolutions of the engine 26, $N_e$, is controlled within the control target range shown in FIG. 3A by executing steps 106–112.

Also, in the embodiment, the throttle angle of the engine 26, S, is corrected in response to the result of comparison between the generator output P and its control target range. When the throttle angle S becomes large, the load of the engine 26 increases and when it becomes small, the load of the engine 26 decreases. Therefore, output of the engine 26 and the generator output of the generator 22 are controlled so that they are placed within the control target range shown in FIG. 3B by correcting the throttle angle S based on the processing results of steps 114–120.

In addition, in the embodiment, the number of revolutions of the engine 26, $N_e$, is controlled, and then the generator output of the generator 22, P, is controlled. Therefore, unlike the case where they are controlled in the reverse order as in Japanese Patent Laid-Open No.Hei 6-98411, preferred target control of both the number of revolutions of the engine 26, $N_e$, and the generator output of the generator 26, P, can be performed irrespective of whether the load of the engine 26 is high or low. That is, if first the generator output P is controlled and then the number of revolutions, $N_e$, is controlled, the generator output of the generator 22, P, may be placed out of the control target range as a result of controlling the number of revolutions, $N_e$, because the relationship between the number of revolutions of the engine 26, $N_e$, and its output varies depending on whether the load is high or low, as shown in FIGS. 8A and 8B. In the embodiment, preferred target control of the number of revolutions, $N_e$, and the generator output P described above can be executed without causing such trouble, namely, independently of the load of the engine 26.

Thus, according to the embodiment, target control of both the number of revolutions of the engine 26, $N_e$, and the generator output of the generator 22, P, can be performed independently of mass production variations in individual characteristics of the engine 26 and the generator 22, or change with time in their individual differences and independently of the load of the engine 26. If the control target of the number of revolutions of the engine 26, $N_e$, is preset to the number of revolutions at which the engine 26 can be efficiently run with good emission, highly efficient running of the engine 26 and improvement in emission are enabled.

Preferably, the generator output P used for the control described above is a moving average value of the products of the voltage found by the voltage sensor 40 and the current found by the current sensor 42. Other conditions than the throttle angle S may be used as run conditions of the engine 26 adjusted to control the generator output P.

b) Second embodiment

Figure 4:
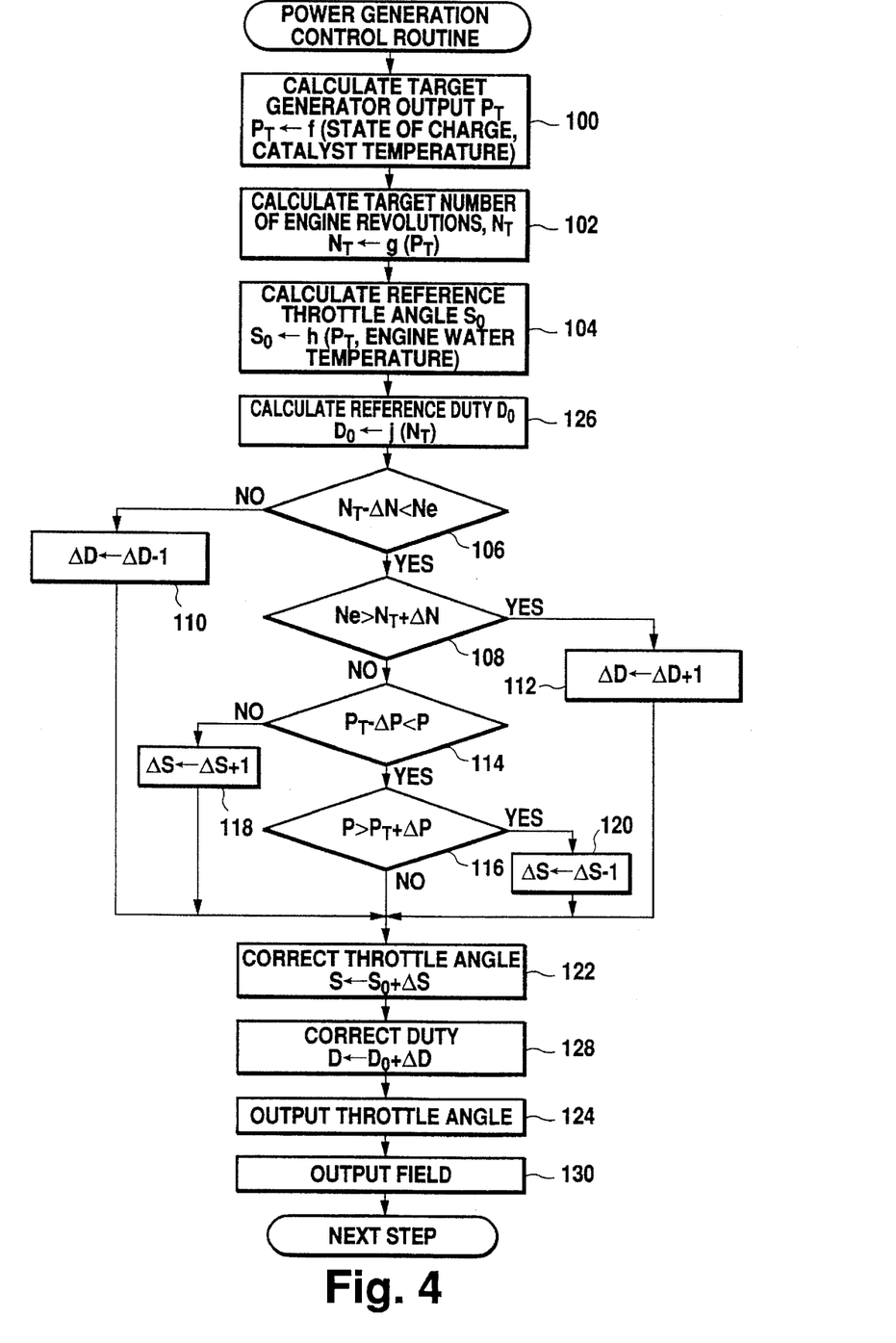
FIG. 4 is a flowchart showing an operation flow of an ECU in a second embodiment of the invention.

FIG. 4 shows an operation flow of an SHV and in particular of an ECU 44 according to a second embodiment of the invention. The second embodiment can have the same configuration as the first embodiment shown in FIG. 1. The second embodiment differs from the first embodiment in that the field current of a generator 22 is controlled by specifying and outputting duty rather than by controlling on/off duration or amplitude of the field current.

In FIG. 4, after step 104 is executed, and reference duty $D_o$ is calculated at step 126. That is, the target number of engine revolutions, $N_T$, found at step 102 is referenced in table j, thereby calculating the reference duty $D_o$. At step 110 where the field current is made small, 1 is subtracted from a duty correction amount $\Delta D$; at step 112 where the field current is made large, 1 is added to a duty correction amount $\Delta D$. The correction amount $\Delta D$ thus found is added to the reference duty $D_o$ at step 128 executed immediately after step 122. When the duty D is thus found, field current having the duty D is output to the generator 22 at step 130 executed after step 124 is executed. The effect described above can also be produced by such an operation. $\Delta D$ is also reset similarly to $\Delta S$.

c) Third embodiment

Figure 5:
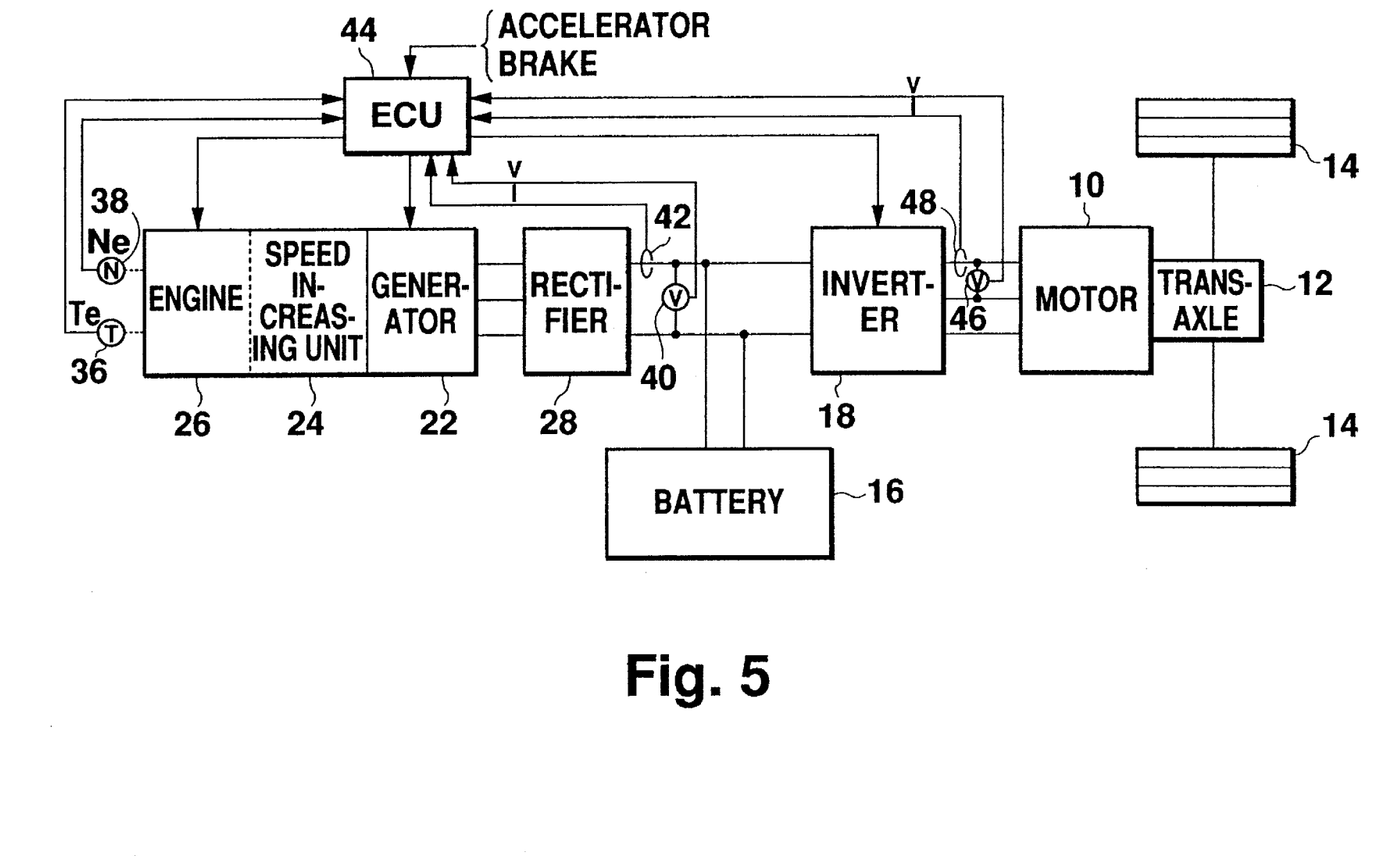
FIG. 5 is a block diagram showing the system configuration of an SHV according to a third embodiment of the invention.

FIG. 5 shows the configuration of an SHV according to a third embodiment of the invention. In the embodiment, a voltage sensor 46 for detecting a voltage supplied to a motor 10 and a current sensor 48 for detecting a current supplied thereto are used in place of the SOC sensor 30 and the temperature sensor 34 used in the first embodiment. Instead of SOC and $T_{hw}$, a value representing the load of the motor 10, namely, the product of an output of the voltage sensor 46 and an output of the current sensor 48 is used to calculate target generator output $P_T$ in the third embodiment. The effect described above can also be produced in a preferred manner by such an operation.

d) Effects

As described above, according to the invention, the field current of the generator and the run conditions of the engine are corrected in response to the detection results of the number of revolutions of the engine and the generator output of the generator, so that preferred target control of both the number of revolutions of the engine and the generator output of the generator can be performed. Therefore, mass production variations in the engine and generator characteristics, and occurrence of a control error associated with their change with time, can be prevented. Since target control of the number of engine revolutions is first performed by correcting the field current and then target control of the generator output of the generator is performed by correcting the run conditions of the engine, the target control described above can be executed in a preferred manner irrespective of whether the load of the engine is high or low. Further, such control can be performed to efficiently run the engine and reduce its emission for improving the power generation efficiency of the generator.

What is claimed is:

1. An electric power generation control method executed by control means in a hybrid vehicle equipped with a motor as a driving source of the vehicle; a generator for supplying a power generation output thereof to the motor; an engine for driving the generator for rotation; means for detecting the number of revolutions of the engine and a generator output of the generator; and the control means for controlling a field current of the generator and a run condition of the engine, said method comprising the steps of:

determining a control target range for the number of revolutions of said engine and a control target range for the generator output of said generator;

correcting the field current of said generator to a smaller value if the detected number of revolutions of said engine is lower than the control target range for the number of revolutions or correcting the field current of the generator to a larger value if the detected number of revolutions of said engine is higher than the control target range for the number of revolutions; and correcting the run condition of said engine so that when the detected number of revolutions of said engine is within the control target range for the number of revolutions, a load of said engine is increased if the detected generator output of said generator is lower than the control target range for the generator output, or the load of said engine is decreased if the detected generator output of said generator is higher than the control target range for the generator output, whereby the number of revolutions of said engine and the generator output of said generator are both controlled within their respective control target ranges.

2. The method as claimed in claim 1 wherein said hybrid vehicle comprises means for detecting a voltage applied to said motor from said generator and means for detecting a current supplied to said motor from said generator, wherein the generator output of said generator is detected by calculating a moving average value of products of the detected voltage and detected current.

3. The method as claimed in claim 1 wherein a target generator output of said generator is set, the target number of revolutions of said engine is set based on the set target generator output, and a predetermined range centering around the determined target number of revolutions is set as the control target range of the number of revolutions of said engine.

4. The method as claimed in claim 3 wherein said hybrid vehicle comprises a battery disposed between said generator and said motor, means for detecting a state of charge of said battery, and means for detecting a catalyst temperature of said engine, wherein the target generator output of said generator is set based on a remaining capacity of said battery and the catalyst temperature of said engine.

5. The method as claimed in claim 3 wherein said hybrid vehicle comprises means for detecting power consumption of said motor, wherein the target generator output of said generator is set based on the power consumption of said motor.

6. The method as claimed in claim 5 wherein the power consumption of said motor is detected by detecting a terminal voltage and a current of said motor and calculating a product of the detected terminal voltage and current.

7. The method as claimed in claim 3 wherein said hybrid vehicle comprises means for detecting a warm-up condition of said engine, wherein a reference value of the run condition to be corrected is set based on the target generator output of said generator and the warm-up condition of said engine.

8. The method as claimed in claim 7 wherein the warm-up condition of said engine is detected as a temperature of cooling water of said engine.

9. The method as claimed in claim 1 wherein on/off duration of the field current is controlled.

10. The method as claimed in claim 1 wherein amplitude of the field current is controlled.

11. The method as claimed in claim 1 wherein duty of the field current is controlled.

12. The method as claimed in claim 1 wherein the run condition is a throttle angle of said engine.

13. An electric power generation controller mounted in a hybrid vehicle having a motor as a driving source of the vehicle; a generator for supplying a power generation output thereof to the motor; and an engine for driving the generator for rotation, said controller comprising:

means for determining a control target range for a number of revolutions of said engine and a control target range for the generator output of said generator;

means for detecting the number of revolutions of said engine and the generator output of said generator;

means for correcting a field current of said generator to a smaller value if the detected number of revolutions of said engine is lower than the control target range for the number of revolutions or for correcting the field current to a larger value if the detected number of revolutions of said engine is higher than the control target range for the number of revolutions; and means for correcting a run condition of said engine so that when the detected number of revolutions of said engine is within the control target range for the number of revolutions, the means for correcting the run condition increases a load of said engine if the detected generator output of said generator is lower than the control target range for the generator output or decreases the load of said engine if the detected generator output of said generator is higher than the control target range for the generator output, whereby the number of revolutions of said engine and the generator output of said generator are both controlled within their respective control target ranges.

14. A hybrid vehicle comprising:

a motor as a driving source of the vehicle;

a generator for supplying a power generation output thereof to the motor;

an engine for driving the generator for rotation; and an electric power generation controller comprising:

a) means for determining a control target range for a number of revolutions of said engine and for determining a control target range for a generator output of said generator;

b) means for detecting the number of revolutions of said engine and the generator output of said generator;

c) means for correcting a field current of said generator to a smaller value if the detected number of revolutions of said engine is lower than the control target range for the number of revolutions or for correcting the field current to a larger value if the detected number of revolutions of said engine is higher than the control target range for the generator output; and d) means for correcting a run condition of said engine so that when the detected number of revolutions of said engine is within the control target range for the number of revolutions, the means for correcting the run condition increases a load of said engine if the detected generator output of said generator is lower than the control target range for the generator output or decreases the load of said engine if the detected generator output of said generator is higher than the control target range for the generator output, whereby the number of revolutions of said engine and the generator output of said generator are both controlled within their respective control target ranges.

* * * * *